United States Patent
Marshall et al.

(10) Patent No.: US 9,549,310 B2
(45) Date of Patent: Jan. 17, 2017

(54) LIFECYCLE CONFIGURATION OF MOBILE SUBSCRIBER

(71) Applicant: ESEYE LIMITED, Surrey (GB)

(72) Inventors: Paul Marshall, Surrey (GB); Ian Marsden, Surrey (GB)

(73) Assignee: ESEYE LIMITED, Surrey (GB)

( * ) Notice: Subject to any disclaimer, the term of this patent is extended or adjusted under 35 U.S.C. 154(b) by 0 days.

(21) Appl. No.: 14/366,882

(22) PCT Filed: Dec. 17, 2012

(86) PCT No.: PCT/GB2012/053161
§ 371 (c)(1),
(2) Date: Jun. 19, 2014

(87) PCT Pub. No.: WO2013/093440
PCT Pub. Date: Jun. 27, 2013

(65) Prior Publication Data
US 2014/0335856 A1     Nov. 13, 2014

(30) Foreign Application Priority Data
Dec. 19, 2011 (GB) .................................. 1121814.6

(51) Int. Cl.
| | |
|---|---|
| H04W 4/00 | (2009.01) |
| H04W 8/04 | (2009.01) |
| H04W 8/18 | (2009.01) |
| H04W 8/26 | (2009.01) |
| H04W 88/06 | (2009.01) |

(52) U.S. Cl.
CPC ................ *H04W 8/04* (2013.01); *H04W 8/183* (2013.01); *H04W 8/265* (2013.01); *H04W 88/06* (2013.01)

(58) Field of Classification Search
CPC ........ H04W 8/04; H04W 8/183; H04W 8/265; H04W 88/06
USPC ................ 455/411, 433, 432.2, 435.1, 435.3, 557,455/558; 370/241, 248, 338
See application file for complete search history.

(56) References Cited

U.S. PATENT DOCUMENTS

| | | | | |
|---|---|---|---|---|
| 7,912,464 | B2* | 3/2011 | Jiang ....................... | H04W 8/26 455/432.1 |
| 8,145,212 | B2* | 3/2012 | Lopresti ................ | H04W 8/265 370/241 |
| 9,113,308 | B2* | 8/2015 | Tagg ....................... | H04W 8/18 |
| 2007/0232354 | A1* | 10/2007 | Moscovitz ............ | H04W 8/265 455/557 |
| 2010/0098035 | A1* | 4/2010 | Shi ...................... | H04L 41/5054 370/338 |

FOREIGN PATENT DOCUMENTS

| | | |
|---|---|---|
| GB | 2 473 753 | 3/2011 |
| WO | WO 2009/073305 | 6/2009 |
| WO | WO 2010/102236 | 9/2010 |

\* cited by examiner

*Primary Examiner* — Amancio Gonzalez
(74) *Attorney, Agent, or Firm* — Leason Ellis LLP

(57) ABSTRACT

A cellular device 10 has a SIM 12 having a unique identifier 14, for example formatted as an IMSI. The cellular device is activated by a registration process which registers the SIM to a selected home network. In this way, the cellular device can be bundled with a SIM before it is known for which country, region or network the cellular device will be sold.

12 Claims, 1 Drawing Sheet

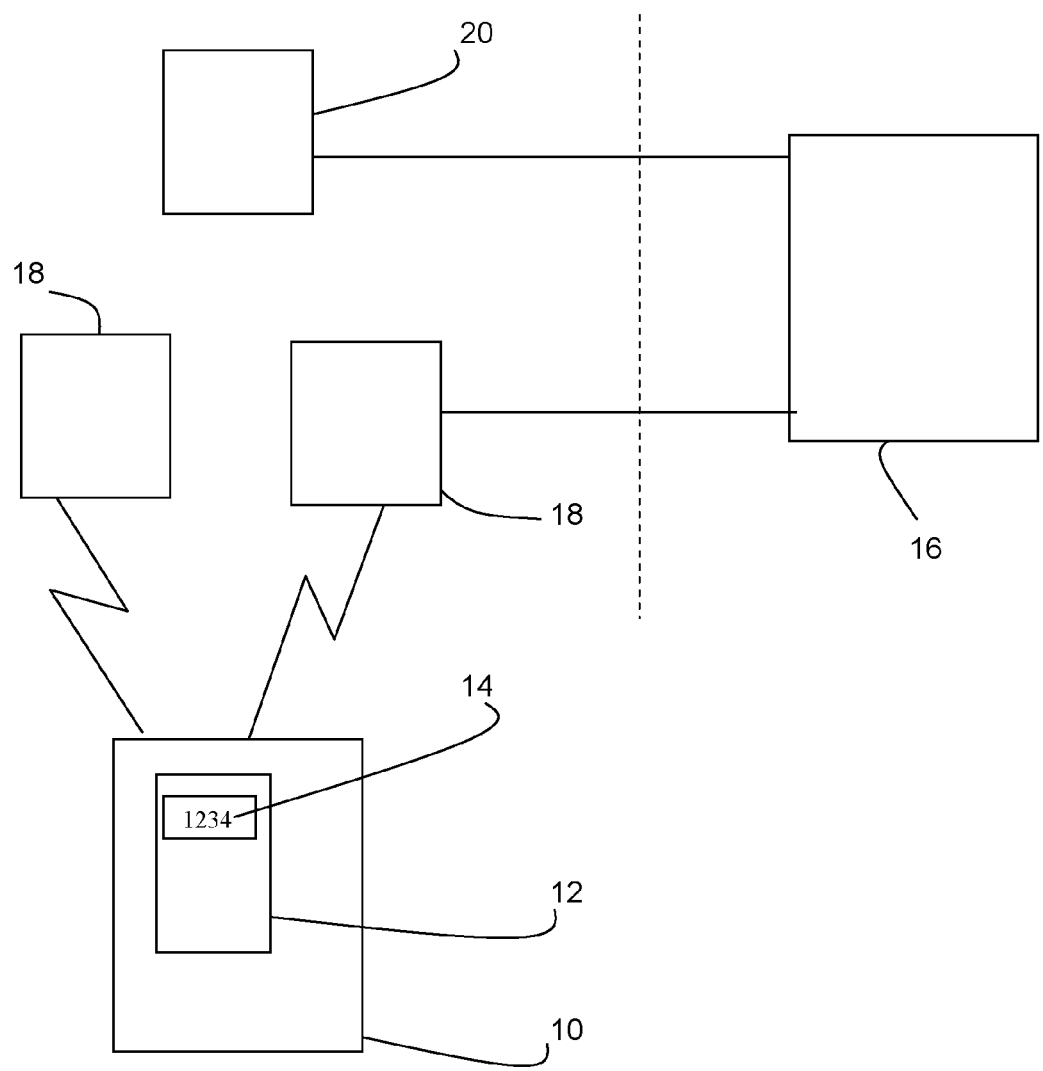

LIFECYCLE CONFIGURATION OF MOBILE SUBSCRIBER

CROSS REFERENCE TO RELATED APPLICATIONS

The present application is a U.S. National Phase of International Patent Application PCT/GB2012/053161, filed Dec. 17, 2012, which claims priority to GB Patent Application No. 1121814.6, filed Dec. 19, 2011, each of which is incorporated herein by reference in its entirety.

FIELD OF INVENTION

The invention relates to a method and apparatus for the activation of cellular devices.

BACKGROUND ART

A number of different types of cellular devices exist, often referred to as mobile devices, which communicate through cellular networks such as GSM and 3G. Other countries and territories may use different systems. The commonest type of cellular device is a cellular telephone or mobile telephone, though other devices exist, which need not in fact be mobile—GSM and 3G networks can also be used in fixed installations.

Cellular telephones may be sold either with or without contracts for the supply of mobile telephony services. In either case, the supply of mobile telephony services is typically regulated with a subscriber identification module (SIM) card. If the mobile telephony services are supplied with the cellular telephone, as is common in the consumer market, the SIM card may be bundled with the cellular telephone; if not, the SIM card may be supplied separately after concluding an airtime agreement.

The SIM card is programmed with an international mobile subscriber identity (IMSI) which identifies the subscriber. The IMSI includes a number of digits, the first being three digits of the mobile country code, MCC, which indicates the country, followed by two or three digits indicating the individual mobile network, the mobile network code MNC. The rest of the IMSI includes the mobile subscriber identification number which identifies the individual subscriber of the mobile network. Thus, the SIM card is specific for a particular mobile network. For this reason, when a cellular telephone is manufactured for multiple countries and/or networks, the SIM card cannot be bundled with the cellular telephone until the destination country and network are known.

SUMMARY OF INVENTION

The invention provides a cellular device with a SIM. A registration process is used to register the SIM, including selecting a home network as part of the registration process. This allows a SIM to be bundled during manufacture of a cellular device and activated for different territories and/or networks. The SIM and in particular the unique subscriber identity of the SIM, for example the international mobile subscriber identity (IMSI) or other identity, is not changed in this process.

Alternatively, the SIM may be supplied separately. Again, however, a single SIM can be activated for different territories and/or networks.

The selecting process may take place in the cellular device, in a server separate from the device or in cooperation between the cellular device and the server, for example using a data call between the cellular device and server to exchange information to make the selection.

At first sight this would not seem possible because the IMSI identifies the country of registration and the cellular network of the cellular device. Accordingly, conventionally it is not possible to supply a SIM except for a specific country and network. However, the inventors have realized that there are a number of ways to overcome this difficulty as will be explained in more detail below.

BRIEF DESCRIPTION OF DRAWINGS

The invention will now be described, purely by way of example, with reference to the accompanying drawing, in which:

FIG. 1 shows a cellular device and network according to a first embodiment of the invention.

DETAILED DESCRIPTION

Referring to FIG. 1, a cellular device 10 is packaged together with a subscriber identity module (SIM) 12. A unique number 14 in the format of an IMSI number is assigned to the SIM. The SIM is integrated into the cellular device, i.e. it is formed in the hardware of the cellular device and is not, in this embodiment, a conventional card. The integration of the SIM into the cellular device can reduce costs and ease manufacture and supply, since a single packaged device can be manufactured and sold for different territories and/or networks without needing a separate supply chain for SIM cards for different countries or territories and different networks.

In use, a user will obtain the cellular device 10 and switch it on. The cellular device will then detect one or more cellular stations 18 with which it can communicate.

The cellular device now goes through a registration process by which the user is required to register the cellular device. During the registration process a home network for the user is selected, by the user, by the cellular device, or by a combination of the user and cellular device. In particular, the cellular device may display a selection of possible home networks for the user to select.

To achieve this, on switching on the cellular device the registration process is begun by making connection through an available cellular station 18 to a registration server 16 which handles the registration. The unique number 14 is sent to the registration server where it is used to identify the cellular device to the registration server.

The user may then be presented with a list of possible home networks. These may be selected on the basis of a preprogrammed list depending on the country of activation, or from available networks from which a signal is detected when the cellular device is activated, or indeed in other ways, including a combination of these approaches.

After user selection of one of the possible home networks, the identity of the selected home network is passed to the registration server 16. Then the registration server 16 passes the unique number 14 of the cellular device 10 to the home location register 20 (HLR) of the selected home network and requests activation of an account. Note that the selected home network need not be the network of cellular station 18 used to make the call.

It might at first be thought that this would not work, as the SIM is then registered to the selected home network but the IMSI will relate to a different network, which may well be in a different country.

There are a number of ways of dealing with this issue.

Firstly, in some applications roaming of the cellular device may not be possible —cellular devices can be used in applications that are either fixed or limited to one country or region. In this case, the registration of the IMSI with the selected home network is all that is required—the cellular device uses that home network which recognizes the SIM as a registered local device and permits use as a conventional locally registered cellular device. The fourth embodiment below is an example of such an application.

Secondly, the IMSI may be registered in particular to the manufacturer of the cellular device, i.e. be an IMSI with a country code and network code selected by the manufacturer. This may be a country code such as MCC901, a container for super-political telephone services. The manufacturer may then arrange with one or more networks for those networks to accept cellular devices with such IMSI's as home cellular devices on the local network.

When roaming, the cellular device will still be treated as belonging to the network corresponding to the IMSI, i.e. the network of the manufacturer of the mobile device. Of course, by agreement between the networks involved, billing may still take place based on the relationship between the selected network and the network used for roaming.

An alternative solution is discussed below with reference to the third embodiment.

In these alternative approaches, the SIM is hard-wired with a fixed IMSI identity. The inventors have realized that it is possible to achieve remote activation of a SIM in multiple countries and/or networks without having a programmable IMSI that is changeable in software. Allowing an IMSI to be changed in use would greatly increase the chances of fraud. In contrast, by achieving remote activation of a SIM with an unchangeable IMSI the cellular device once activated is no more susceptible to fraud than a conventional cellular device.

The embodiment described above hard-wires the SIM as an integral part of the cellular device 10. This further reduces the possibility of fraud.

However, in an alternative approach, instead of hard-wiring the SIM 12 as part of the cellular device 10 the SIM is implemented as a separate SIM card in a more conventional fashion. This allows the use of a conventional mobile telephone without modification, and still allows the SIM card to be bundled with the mobile telephone during manufacture easing the supply process.

In a second embodiment, a variant of the approach described above is used for registration. Accordingly, other details, in common with the first embodiment are not necessarily repeated in the following.

In the second embodiment a SIM is manufactured with an initial IMSI corresponding to an initial home network. As with the first embodiment, the SIM may be a separate card or integrated into a cellular device.

The SIM and its corresponding initial IMSI is registered with the initial home network so that a cellular device using the SIM may make conventional mobile telephony calls. The initial home network need not be the country that it is intended to market the device. Conveniently, the registration server 16 is part of the initial home network though this is not essential.

When the cellular device 10 is switched on, the cellular device determines available GSM channels and signal quantity of those channels.

Then, the registration process takes place as will now be described in some detail.

To commence the registration process, the cellular device 10 makes a data connection using one of the available GSM channels to the registration server 16 as a conventional roaming data connection billed to the initial home network.

The cellular device then transmits the list of available GSM channels and signal quality to the registration server 16.

The registration server 16 then determines a selected GSM network. This may depend on the price of service, the available networks, the signal strength and other factors that may be programmed in or selected by the user as required. The registration server 16 may transmit a choice of networks to the user of the cellular device 10 using the data connection which is displayed on the cellular device. The user's selected network is then transmitted back to the registration server.

Alternatively, the registration server 16 may simply determine an available network without reference to the user. This may be particularly appropriate when the manufacturer of the cellular device only sells that device for a single cellular network in each country.

Either way, the registration server then transmits or confirms the selected cellular network to the cellular device and requests disconnection of the cellular device 10 from any mobile network for a time.

While the cellular device 10 is disconnected, the registration server 16 transmits a request to the HLR 20 of the initial mobile network to which the SIM is currently subscribed, and requests termination of the account and removal of the SIM from the records of the initial mobile network.

Then, the registration server 16 contacts the selected cellular network to request activation of that SIM on the selected mobile network.

When the cellular device is reconnected after a time, the cellular device is reconfigured with the selected mobile network as the home network.

In a third embodiment, the registration process does not merely take place when first switching on the cellular device. Instead, the cellular device may include software that detects when the presently selected home network is unavailable. In this case, the cellular device may reinitiate the registration process.

Such an approach allows portability of a cellular device between countries and not merely within a single country. This is particularly appropriate for cellular devices that are used in multiple countries.

Note that in this case the roaming issue is dealt with in a different way to the first and second embodiments. In this approach, the cellular device does not "roam" in the usual way. Instead, a different home network is selected when the cellular device is outside the range of the originally selected home network.

One example where the invention may be of use is in the manufacture of equipment incorporating cellular functionality.

Accordingly, a fourth embodiment of a cellular device according to the invention is a domestic alarm system, in which the manufacture includes a facility to use a cellular network to alert the owner of an incident. Using the invention, even though the alarm may be sold in multiple markets, the manufacturer may include a SIM not associated with any operator's network.

After installation, the installer will request that the IMSI is displayed on the control panel of the domestic alarm and will then manually log onto the registration server, not through the mobile network of the domestic alarm but through a web browser connected to the internet. The installer enters the necessary information regarding the IMSI which is used to complete registration, including registration of the IMSI.

It will be noted that this type of application of a cellular device, which is essentially fixed, avoids the need to implement roaming and hence there is no need for complicated agreements or arrangements to permit roaming.

As described in the embodiments above, using these embodiments there is no need to select the country of use during manufacture of a SIM. This allows the SIM to be manufactured and included with a cellular device, either as a separate card or as part of the cellular device, and only subsequently localizing the device. There is no need to determine country of use before sale.

The embodiments are applicable to a number of different types of cellular device, including for example a conventional mobile telephone, portable digital assistant (PDA) or other devices.

Those skilled in the art will realize that the invention may be implemented in many alternative ways and applications.

The invention claimed is:

1. A method of activating a cellular device having a fixed hard-wired unique subscriber identity corresponding to an initial home network stored in a subscriber identity module (SIM), the method comprising:
   activating the SIM in the cellular device; and
   registering the cellular device on a network with its unique subscriber identity;
   wherein the step of registering the cellular device on a network includes transmitting the details of the unique subscriber identity to a registration server and cooperating with the registration server to select a selected home network from a plurality of home networks and to register the SIM and the unique subscriber identity corresponding to the initial home network as a user of the selected home network on the home location register of the selected home network different to the initial home network in spite of the unique subscriber identity corresponding to the initial home network.

2. A method according to claim 1, wherein the unique subscriber identity is an initial international mobile subscriber identity allocated to an initial home network,
   wherein the step of registering the cellular device on a network further comprises:
   scanning available channels and determining available mobile operators and signal quality;
   selecting one of the available mobile operators and setting up a data call with the server as a roaming data call with the initial home network as the home network;
   sending to the server the list of available networks and signal levels; and
   receiving from the server the identify of the selected home network selected from the list of available networks.

3. A method according to claim 2, further comprising:
   sending from the server to the home location register of the initial home network a termination request for the initial international mobile subscriber identity as a customer of the initial home network;
   sending from the server to the home location register of the selected home network a request to activate the account of the SIM card on the selected home network.

4. A method according to claim 1, further comprising identifying when the selected home network is no longer available, and repeating the step of registering the cellular device when the selected home network is no longer available.

5. A method according to claim 1 wherein the SIM is a SIM card that may be incorporated and removed from the cellular device.

6. A method according to claim 1 wherein the SIM is integrally formed in the cellular device.

7. A cellular device, comprising:
   a subscriber identity module (SIM) with a fixed hard-wired unique subscriber identifier registered to an initial home network; and
   code means for activating the cellular device by registering the cellular device on a network by:
   selecting a home network from a plurality of home networks;
   opening a connection to the home location register of the selected home network; and
   registering the SIM with its unique identifier as a user of the selected home network, the selected home network not being the initial home network.

8. A cellular device according to claim 7, wherein the code means is further arranged, when registering the cellular device on a network:
   to scan available channels and determine available mobile operators and signal quality;
   to select one of the available mobile operators and setting up a data call with a server as a roaming data call with the initial home network as the home network;
   to send to the server the list of available networks and signal levels; and
   to receive from the server the identify of the selected home network selected from the list of available networks.

9. A method of registering a cellular device in a registration server, comprising:
   receiving a data call from the cellular device including a fixed hard-wired unique subscriber identity of the cellular device corresponding to an initial home network and network information indicating home networks available to the cellular device;
   selecting in the registration server a home network from a plurality of home networks, the selected home network being different from the initial home network in spite of the unique subscriber identity corresponding to the initial home network;
   transmitting the selected home network to the cellular device;
   opening a connection to the home location register of the selected home network; and
   registering the SIM and its unique subscriber identity as a user of the selected home network.

10. A method according to claim 9, wherein the step of receiving a data call includes receiving the data call using an initial home network as the home network for the data call, the method further comprising:
    sending from the registration server to the home location register of the initial home network a termination request for the unique subscriber identity as a customer of the initial home network;
    sending from the server to the home location register of the selected home network a request to activate the account of the SIM card with the unique subscriber identity on the selected home network.

11. A computer program product recorded on a non-transitory data carrier, the computer program product including code means arranged to cause a computer:
    to receive a data call froth the cellular device including a fixed hard-wired unique subscriber identity of the cellular device corresponding to an initial home network and network information indicating home networks available to the cellular device;

to select in the registration server a home network from a plurality of home networks, the selected home network being different from the initial home network in spite of the unique subscriber identity corresponding to the initial home network;

to transmit the selected home network to the cellular device;

to open a connection to the home location register of the selected home network; and to register the SIM and its unique subscriber identity as a user of the selected home network.

12. A computer program product according to claim 11, wherein the code means is further arranged:

to send from the registration server to the home location register of the initial home network a termination request for the unique subscriber identity as a customer of the initial home network; and to send from the server to the home location register of the selected home network a request to activate the account of the SIM card with the unique subscriber identity on the selected home network.

* * * * *